United States Patent
Sayilir et al.

(10) Patent No.: US 10,778,267 B1
(45) Date of Patent: Sep. 15, 2020

(54) RADIO FREQUENCY SIGNAL DETECTOR AND METHOD THEREOF

(71) Applicant: Realtek Semiconductor Corp., Hsinchu (TW)

(72) Inventors: Serkan Sayilir, San Jose, CA (US); Poh Boon Leong, Pleasanton, CA (US); Chia-Liang (Leon) Lin, Fremont, CA (US)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 0 days.

(21) Appl. No.: 16/559,707

(22) Filed: Sep. 4, 2019

(51) Int. Cl.
   *H04B 1/10* (2006.01)

(52) U.S. Cl.
   CPC .................. *H04B 1/1027* (2013.01)

(58) Field of Classification Search
   CPC ............... G08G 1/137; G01C 21/3626; G01C 21/3667; H04W 4/046; H04W 4/008; G01S 19/13
   USPC .................................................. 340/902, 350
   See application file for complete search history.

(56) References Cited

U.S. PATENT DOCUMENTS

| | | | | |
|---|---|---|---|---|
| 2009/0247100 A1* | 10/2009 | Meltzer | ................... | H03D 1/06 455/182.1 |
| 2010/0176982 A1* | 7/2010 | Lachartre | ............ | H03M 1/1235 341/155 |
| 2011/0296269 A1* | 12/2011 | Tsai | ................... | H03M 13/2933 714/752 |
| 2012/0008723 A1* | 1/2012 | Stojanovic | .............. | H03L 7/091 375/355 |
| 2014/0266408 A1* | 9/2014 | Guimaraes | .............. | H01L 29/94 327/534 |
| 2016/0099765 A1* | 4/2016 | Hosokawa | ............. | H04B 7/084 375/347 |

* cited by examiner

*Primary Examiner* — Tanmay K Shah
(74) *Attorney, Agent, or Firm* — McClure, Qualey & Rodack, LLP

(57) ABSTRACT

A RF (radio frequency) signal detector includes an I/Q (in-phase/quadrature) mixer configured to convert an amplified signal, received from a low-noise amplifier, into a baseband signal having an in-phase component and a quadrature component in accordance with a LO (local oscillator) signal; a local oscillator configured to output the LO signal; a pair of baseband filters configured to output a filtered signal comprising an in-phase component and a quadrature component; a pair of 3-level slicers configured to receive the filtered signal and output a sliced signal having an in-phase component and a quadrature component; a pair of data flip flops configured to sample the sliced signal into a decision including an in-phase component and a quadrature component in accordance with a sampling clock signal; and a digital signal processor configured to determine an existence and characteristic of a component of the RF signal around a frequency of the LO signal.

20 Claims, 8 Drawing Sheets

RADIO FREQUENCY SIGNAL DETECTOR AND METHOD THEREOF

BACKGROUND OF THE DISCLOSURE

Field of the Disclosure

The present disclosure generally relates to radio frequency signal detection, and more particularly to a circuit and method for detecting a radio frequency signal.

Description of Related Art

A radio frequency (RF) signal of a radio frequency carrying a message is transmitted by a transmitter, propagated over the air, and received by a receiver that is supposed to extract the message. Since the atmosphere is a shared medium, it is possible that a first transmitter transmits a first RF signal of a radio frequency at the same time when a second transmitter transmits a second RF signal of the same radio frequency; in this case, a receiver that is supposed to receive the first RF signal of the radio frequency and extract the message therein may fail to extract the message therein correctly due to an interference from the second RF signal. To avoid this scenario, the first transmitter can use a RF signal detector to detect an existence of the second RF signal and avoid transmitting the first RF signal using the same radio frequency as that of the second RF signal.

What is desired is a RF signal detector that can detect an existence of the second RF signal reliably and efficiently.

BRIEF DESCRIPTION OF THIS DISCLOSURE

In an embodiment, a RF (radio frequency) signal detector comprises: a low-noise amplifier configured to receive a RF signal from an antenna and output an amplified signal; an I/Q (in-phase/quadrature) mixer configured to convert the amplified signal into a baseband signal comprising an in-phase component and a quadrature component in accordance with a LO (local oscillator) signal; a local oscillator configured to output the LO signal in accordance with a frequency control signal; a pair of baseband filters configured to receive the baseband signal and output a filtered signal comprising an in-phase component and a quadrature component; a pair of 3-level slicers configured to receive the filtered signal and output a sliced signal comprising an in-phase component and a quadrature component; a pair of data flip flops configured to sample the sliced signal into a decision including an in-phase component and a quadrature component in accordance with a sampling clock signal; and a digital signal processor configured to receive the decision and determine an existence and characteristic of a component of the RF signal around a frequency of the LO signal.

In an embodiment, a method comprises: receiving a RF (radio frequency) signal from an antenna; amplifying the RF signal into an amplified signal using a low-noise amplifier; generating a LO (local oscillator) signal of a frequency determined by a frequency control signal using a local oscillator; converting the amplified signal into a baseband signal comprising an in-phase component and a quadrature component using an I/Q (in-phase/quadrature) mixer in accordance with the LO signal; filtering the baseband signal into a filtered signal comprising an in-phase component and a quadrature component using a pair of baseband filters; slicing the filtered signal into a sliced signal comprising an in-phase component and a quadrature component using a pair of 3-level slicers; sampling the sliced signal into a decision comprising an in-phase component and a quadrature component using a pair of data flip flops in accordance with a sampling clock signal; and determining an existence and characteristic of a component of the RF signal around the frequency of the LO signal based on the decision.

DETAILED DESCRIPTION OF THIS DISCLOSURE

Figure 1A:
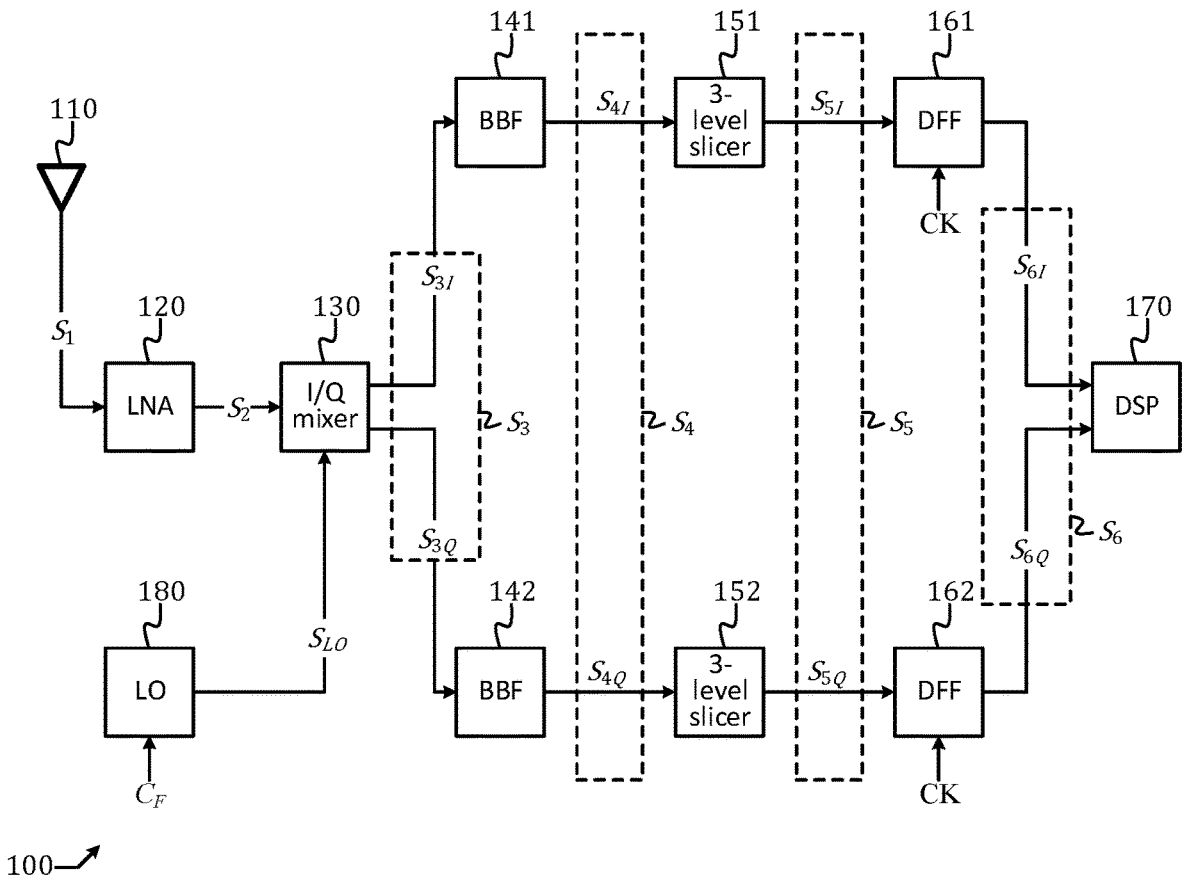
FIG. 1A shows a functional block diagram of a radio frequency signal detector in accordance with an embodiment of the present disclosure.

The present disclosure is directed to radio frequency signal detection. While the specification describes several example embodiments of the disclosure considered favorable modes of practicing the invention, it should be understood that the invention can be implemented in many ways and is not limited to the particular examples described below or to the particular manner in which any features of such examples are implemented. In other instances, well-known details are not shown or described to avoid obscuring aspects of the disclosure.

Persons of ordinary skill in the art understand terms and basic concepts related to microelectronics that are used in this disclosure, such as "voltage," "current," "CMOS (complementary metal oxide semiconductor)," "NMOS (N-channel metal oxide semiconductor) transistor," "PMOS (N-channel metal oxide semiconductor) transistor," "resistor," "capacitor," "resistance," "capacitance," "current source," "bias," "node," "amplifier," "gain," "differential amplifier," "single-ended," "cascode," "series," "shunt," "clock," "frequency," "ring oscillator," "digital-to-analog converter," "current mirror," "differential signal," "common-mode," "opamp," and "negative feedback." Terms like these are used in a context of microelectronics, and the associated concepts are apparent to those of ordinary skills in the art and thus will not be explained in detail here. Those of ordinary skill in the art will also recognize a symbol of NMOS transistor, and identify the "source," the "gate," and the "drain" terminals thereof. Those of ordinary skill in the art also understand units such as MHz (mega-Hertz), KHz (kilo-Hertz), and µs (microsecond).

This present disclosure is disclosed from an engineering perspective. For instance, "X is equal to Y" means "a difference between X and Y is smaller than a specified engineering tolerance"; "X is much smaller than Y" means "X divided by Y is smaller than an engineering tolerance"; and "X is zero" means "X is smaller than a specified engineering tolerance."

In this disclosure, a signal is either a voltage or a current that represents a certain information.

A logical signal is a signal of two states: a high state and a low state. Here, a logical signal is said to be in the high (low) state when a level of said logical signal is above (below) a certain trip point pertaining to said logical signal. Stating that "(the logical signal) X is high," is stating it in a context of logical signal and what is meant is: "(the logical signal) X is in the high state." Stating that "(the logical signal) X is low," is stating it in a context of logical signal and what is meant is: "(the logical signal) X is in the low state." The high state is also known as the "1" state, and the low state is also known as the "0" state. Stating that "(the logical signal) X is 1," is stating it in a context of logical signal and what is meant is: "(the logical signal) X is in the high state." Likewise, stating that "(the logical signal) X is 0," is stating it in a context of logical signal and what is meant is: "(the logical signal) X is in the low state."

A "clock signal" (or simply a "clock") is a logical signal that cyclically toggles between a high state and a low state.

Throughout this disclosure, "$V_{DD}$" denotes a power supply node. For convenience, V "DD" can also refer to a power supply voltage provided at the power supply node. That is, "$V_{DD}$ is 0.9V" means "a power supply voltage at the power supply node $V_{DD}$ is 0.9V."

Throughout this disclosure, a differential signaling scheme is often used, wherein a signal comprises two components denoted with suffixes "+" and "−," respectively, attached in subscript, and a value of said signal is represented by a difference between said two components. For instance, $S_{3I}$ ($S_{4I}$, $S_{5I}$) comprises $S_{3I+}$ ($S_{4I+}$, $S_{5I+}$) and $S_{3I-}$ ($S_{4I-}$, $S_{5I-}$), and a value of $S_{3I}$ ($S_{4I}$, $S_{5I}$) is represented by a difference between $S_{3I+}$ ($S_{4I+}$, $S_{5I+}$) and $S_{3I-}$ ($S_{4I-}$, $S_{5I-}$).

A functional block diagram of a RF (radio frequency) signal detector 100 in accordance with an embodiment of the present disclosure is depicted in FIG. 1A. RF signal detector 100 comprises: a LNA (low-noise amplifier) 120 configured to receive a RF signal $S_1$ from an antenna 110 and output an amplified signal $S_2$; an I/Q (in-phase/quadrature) mixer 130 configured to convert the amplified signal $S_2$ into a baseband signal $S_3$ comprising an in-phase component $S_{3I}$ and a quadrature component $S_{3Q}$ in accordance with a LO (local oscillator) signal $S_{LO}$; a LO (local oscillator) 180 configured to output the LO signal $S_{LO}$ in accordance with a frequency control signal $C_F$; a pair of BBF (baseband filter) 141 and 142 configured to receive the baseband signal $S_3$ and output a filtered signal $S_4$ comprising an in-phase component $S_{4I}$ and a quadrature component $S_{4Q}$; a pair of 3-level slicers 151 and 152 configured to receive the filtered signal $S_4$ and output a sliced signal $S_5$ comprising an in-phase component $S_{5I}$ and a quadrature component $S_{5Q}$; a pair of DFF (data flip flop) 161 and 162 configured to sample the sliced signal $S_5$ into a decision $S_6$ including an in-phase component $S_{6I}$ and a quadrature component $S_{6Q}$ in accordance with a sampling clock signal CK; and a DSP (digital signal processor) 170 configured to receive the decision $S_6$ and determine an existence and characteristic of a component of the RF signal $S_1$.

3-level slicer 151 receives $S_{4I}$ and outputs $S_{5I}$ in accordance with the following equation:

$$S_{5I} = \begin{cases} 1 & S_{4I} \geq V_{TH} \\ 0 & -V_{TH} \leq S_{4I} < V_{TH} \\ -1 & S_{4I} < -V_{TH} \end{cases} \quad (1)$$

Here, $V_{TH}$ is a threshold voltage. Likewise, 3-level slicer 152 receives $S_{4Q}$ and outputs $S_{5Q}$ in accordance with the following equation:

$$S_{5Q} = \begin{cases} 1 & S_{4Q} \geq V_{TH} \\ 0 & -V_{TH} \leq S_{4Q} < V_{TH} \\ -1 & S_{4Q} < -V_{TH} \end{cases} \quad (2)$$

Note that $S_{4I}$ and $S_{4Q}$ jointly form the filtered signal $S_4$, while $S_{5I}$ and $S_{5Q}$ jointly form the sliced signal $S_5$.

RF signal detector 100 functionally resembles a conventional (zero-intermediate-frequency) radio receiver but has a few distinct features. First, a purpose of a conventional radio receiver is to extract a message embedded in a RF signal and therefore needs to be a coherent receiver, wherein a timing of the radio receiver must track a timing of the RF signal. In RF signal detector 100, however, there is no interest in a message embedded in the RF signal $S_1$ and therefore the sampling clock signal CK is independent of and uncorrelated with a timing of the RF signal $S_1$. Second, the conventional radio receiver needs to have a low EVM (error vector magnitude) and therefore functions such as AGC (automatic gain control), AFC (automatic frequency control), and equalization are needed. In contrast, RF signal detector 100 does not need these functions. Third, the conventional radio receiver needs to monitor EVM (to ensure a good EVM) and therefore needs to perform a slicing for a decision in a digital domain to have a sufficiently high resolution to measure the EVM. That is, a first analog-to-digital converter must be inserted between BBF 141 and 3-level slicer 151 to convert $S_{4I}$ into a first digital signal and a second analog-to-digital converter must be inserted between BBF 142 and 3-level slicer 152 to convert $S_{4Q}$ into a second digital signal, wherein the first analog-to-digital converter and the second digital-to-analog converter must have a sufficiently high resolution so that an error of the slicing performed in a succeeding slicer can be sufficiently small. In contrast, RF signal detector 100 does not need to monitor EVM and therefore the slicing is directly performed on $S_{4I}$ and $S_{4Q}$ in an analog domain. These make the radio signal detector 100 much simpler than the conventional radio receiver.

Figure 1B:
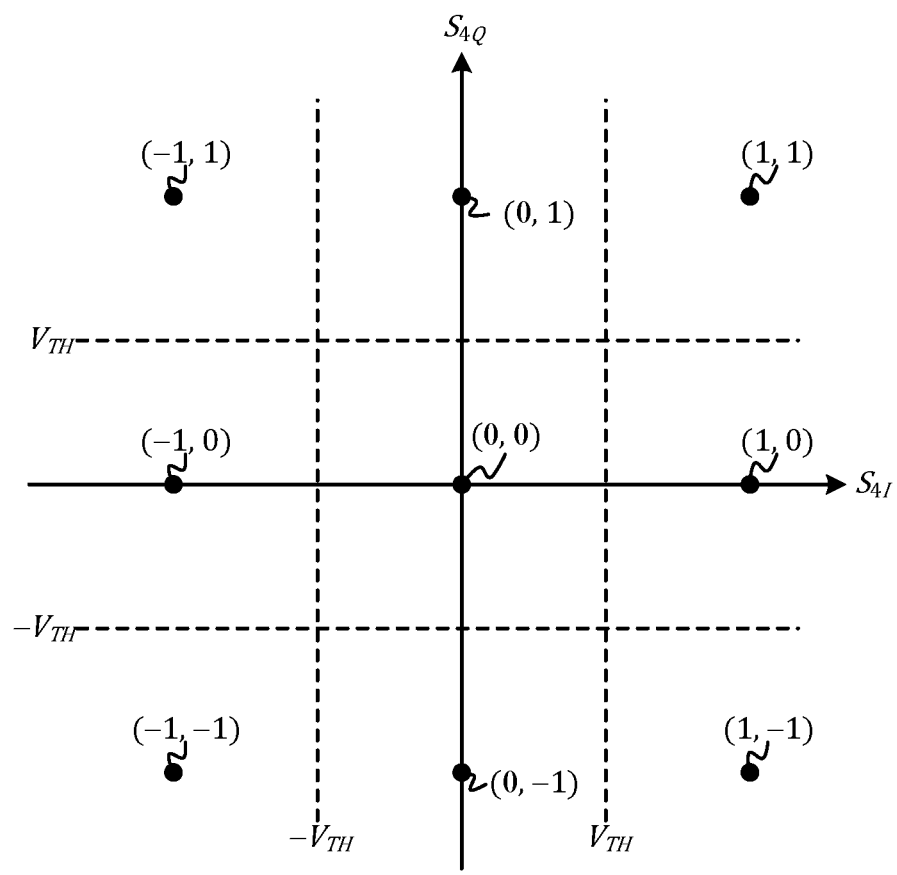
FIG. 1B shows a constellation diagram of the radio signal detector of FIG. 1A.

A constellation diagram of $S_6$ in accordance with equations (1) and (2) is shown in FIG. 1B. Here, a two-dimensional complex plane for $S_4$ is shown, wherein the horizontal axis is $S_{4I}$ and the vertical axis is $S_{4Q}$. For a given combination of $S_{4I}$ and $S_{4Q}$, a decision of $S_5$, which comprises $S_{5I}$ and $S_{5Q}$, is determined and can be presented by a point ($S_{5I}$, $S_{5Q}$) in the complex plane. Per equations (1) and (2), there are nine regions in the complex plane, each pertaining to a distinct decision, defined in accordance with two vertical lines $S_{4I}=V_{TH}$ and $S_{4I}=-V_{TH}$ and two horizontal lines $S_{4Q}=V_{TH}$ and $S_{4Q}=-V_{TH}$. The decision $S_6$, which comprises $S_{6I}$ and $S_{6Q}$ and can be presented by a point ($S_{6I}$, $S_{6Q}$) in the complex plane, is a sample of the sliced signal $S_5$ taken in accordance with the sampling clock signal CK. For instance, $S_6$ is (0,1) if $-V_{TH}<S_{4I}<V_{TH}$ and $S_{4Q}>V_{TH}$ at a sampling edge of the sampling clock signal CK; and $S_6$ is (1, −1) if $S_{4I}>V_{TH}$ and $S_{4Q}<-V_{TH}$ at a sampling edge of the sampling clock signal CK. The threshold voltage $V_{TH}$ is used as a criterion for determining whether $S_{4I}$ ($S_{4Q}$) is appreciable. Among the nine decisions of $S_6$, (0, 0) indicates $S_4$ is not appreciable and the rest eight decisions (1,−1), (0, −1), (−1, 1), (−1, 0), (−1, −1), (0, −1), (1, −1), and (1,0) indicate $S_4$ is appreciable. If $S_6$ is among the eight appreciable decisions, DSP 170 can characterize $S_4$ by observing how $S_6$ moves around those eight appreciable decisions. For instance, if $S_6$ moves in a counterclockwise direction, i.e. from (1, 1) to (0, 1), then to (−1, 1), then to (−1, 0), then to (−1, −1), then to (0, −1), then to (1, −1), then to (1, 0), then back to (1, 1), it indicates $S_4$ has a positive frequency. If $S_6$ moves in a clockwise direction, i.e. from (1, 1) to (1, 0), then to (1, −1), then to (0, −1), then to (−1, −1), then to (−1, 0), then to (−1, 1), then to (0, 1), then back to (1, 1), it indicates $S_4$ has a negative frequency. The time it takes to complete a full cycle of movement can provide an estimate of a frequency of $S_4$. For instance, if $S_6$ takes 1 μs to complete one cycle of counterclockwise movement, it suggests a frequency of $S_4$ is positive 1 MHz. If $S_6$ takes 2 μs to complete one cycle of clockwise movement, it suggests a frequency of $S_4$ is negative 500 KHz. Note that a frequency of (the RF signal) $S_1$ is equal to a frequency of (the LO signal) $S_{LO}$ plus a frequency of (the filtered signal) $S_4$. Therefore, by observing how $S_6$ moves around those eight appreciable decisions, DSP 170 can estimate a frequency of an appreciable component of the RF signal $S_1$.

Low noise amplifiers are well known in the prior art and thus not described in detail here. Although LNA 120 can be embodied using any known low noise amplifier circuit topology, it does not need to have a very low noise figure since there is no need for a low EVM. By way of example but not limitation, a noise figure of LNA 120 is approximately 10 dB. Due to no need to have a very low noise figure, LNA 120 can have a low power consumption, which is usually not possible if a very low noise figure is required.

Figure 2:
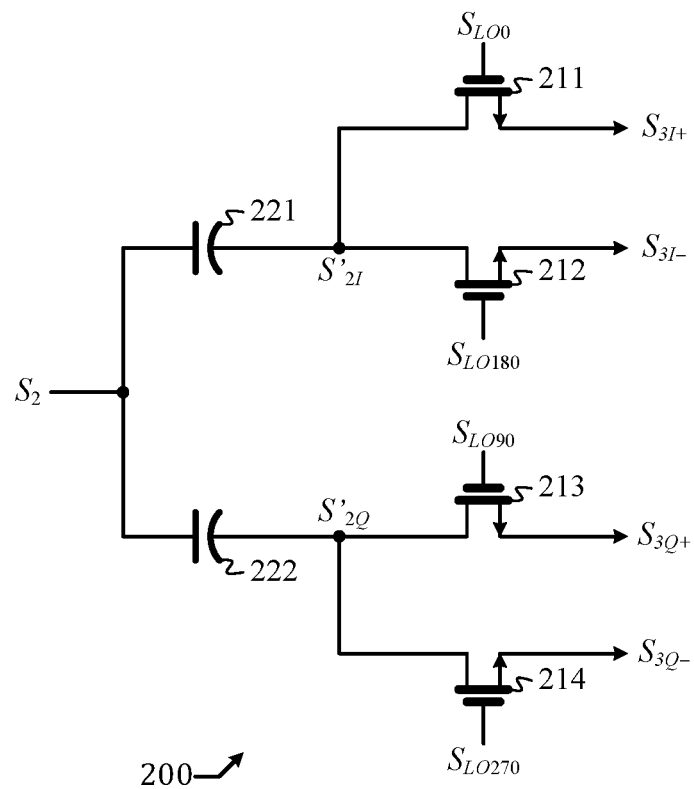
FIG. 2 shows a schematic diagram of an exemplary embodiment of an I/Q (in-phase/quadrature) mixer.

I/Q (in-phase/quadrature) mixers are well known in the prior art and thus not described in detail here. Although I/Q mixer 130 can be embodied using any known I/Q mixer circuit topology, it does not need to have a high linearity since there is no need for a low EVM. By way of example but not limitation, a singly-balanced mixer topology is used to embody I/Q mixer 130, wherein $S_2$ is a single-ended signal and $S_{LO}$ is a four-phase I/Q signal comprising a 0-degree phase $S_{LO0}$, a 90-degree phase $S_{LO90}$, a 180-degree phase $S_{LO180}$, and a 270-degree phase $S_{LO270}$. Singly-balanced mixers and four-phase I/Q signal are well known in the prior art and thus not described in detail here. A singly-balanced mixer embodiment allows a simple LNA design (due to no need to output a differential signal). A schematic diagram of an exemplary I/Q mixer 200 that can be used to embody I/Q mixer 130 is shown in FIG. 2. I/Q mixer 200 comprises: a first capacitor 221 configured to provide an AC (alternate-current) coupling that couples $S_2$ into a first intermediate signal $S'_{2I}$; a second capacitor 222 configured to provide an AC (alternate-current) coupling that couples $S_2$ into a second intermediate signal $S'_{2Q}$; two NMOS (n-channel metal oxide semiconductor) transistors 211 and 212 configured to conditionally couple $S'_{2I}$ into $S_{3I+}$ and $S_{3I-}$ in accordance with $S_{LO0}$ and $S_{LO180}$, respectively; and two NMOS (n-channel metal oxide semiconductor) transistors 213 and 214 configured to conditionally couple $S'_{2Q}$ into $S_{3Q+}$ and $S_{3Q-}$ in accordance with $S_{LO90}$ and $S_{LO270}$, respectively. Here, $S_{3I+}$ and $S_{3I-}$ are a differential-signal embodiment of $S_{3I}$, i.e. $S_{3I} \equiv S_{3I+} - S_{3I-}$. Likewise, $S_{3Q+}$ and $S_{3Q-}$ are a differential-signal embodiment of $S_{3Q}$, i.e. $S_{3Q} \equiv S_{3Q+} - S_{3Q-}$. NMOS transistors 211, 212, 213, and 214 embody four switches controlled by $S_{LO0}$, $S_{LO180}$, $S_{LO90}$, and $S_{LO360}$, respectively. I/Q mixer 200 is a singly balanced passive I/Q mixer that is self-explanatory to those of ordinary skills in the art and thus not explained in detail here.

Figure 3:
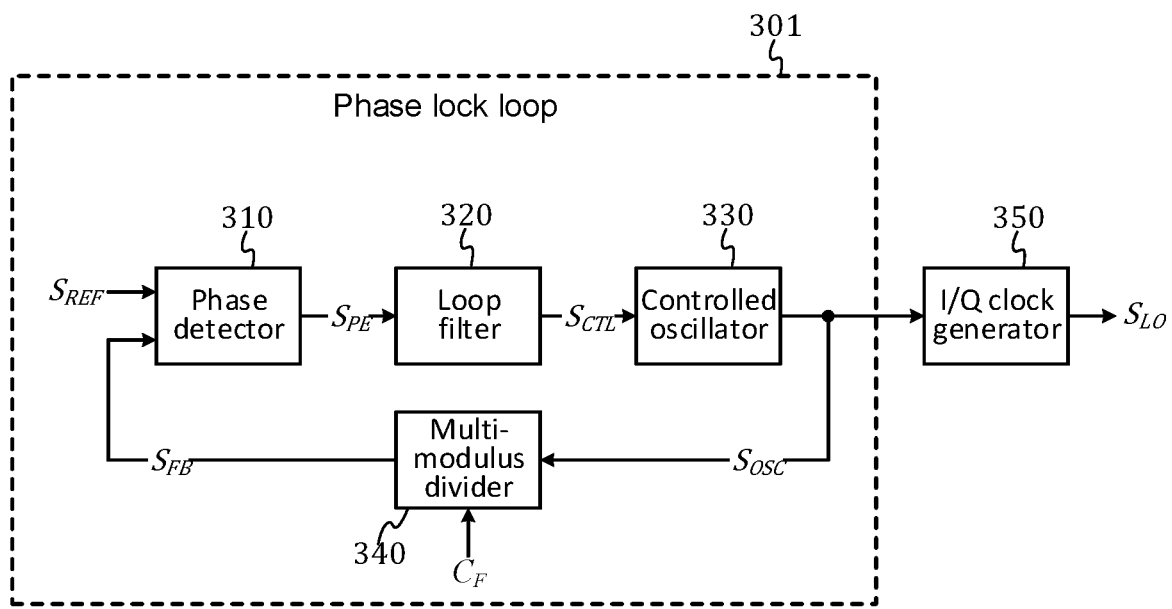
FIG. 3 shows a functional block diagram of a local oscillator.

Local oscillator 180 outputs the LO signal $S_{LO}$ of a frequency controlled by the frequency control signal $C_F$. A functional block diagram of a local oscillator 300 that can be used to embody local oscillator 180 is shown in FIG. 3. Local oscillator 300 comprises a phase lock loop 301 and a I/Q clock generator 350. Phase lock loop 301 comprises: a phase detector 310 configured to output a phase error signal $S_{PE}$ representing a phase difference between a reference clock $S_{REF}$ and a feedback clock $S_{FB}$; a loop filter 320 configured to filter the phase error signal $S_{PE}$ into an oscillation control signal $S_{CTL}$; a controlled oscillator 330 configured to output an oscillation signal $S_{OSC}$ in accordance with the oscillation control signal $S_{CTL}$; and a multi-modulus divider 340 configured to receive the oscillation signal $S_{OSC}$ and output the feedback clock $S_{FB}$ in accordance with the frequency control signal $C_F$, which is a division factor of the multi-modulus divider 340. A frequency of the oscillation signal $S_{OSC}$ is equal to a frequency of the reference clock $S_{REF}$ multiplied by the frequency control signal $C_F$. The I/Q clock generator 350 receives the oscillation signal $S_{OSC}$ and output the LO signal $S_{LO}$, which is a 4-phase I/Q signal. I/Q clock generator 350 can be embodied by, for instance, using a circuit taught by Lin in U.S. Pat. No. 10,209,735. In an alternative embodiment wherein the controlled oscillator 330 is a quadrature output ring oscillator and the oscillation signal $S_{OSC}$ is already a 4-phase I/Q signal, the I/Q clock generator 350 can be removed and the oscillation signal $S_{OSC}$ can be directly used as the LO signal $S_{LO}$. Phase lock loops and circuits therein such as phase detectors, loop filters, controlled oscillators, and multi-modulus dividers are well known in the prior art and thus not explained in detail here. Quadrature output ring oscillators are also known in the prior art; for instance, Lin taught a quadrature output ring oscillator in U.S. Pat. No. 9,252,753.

Figure 4:
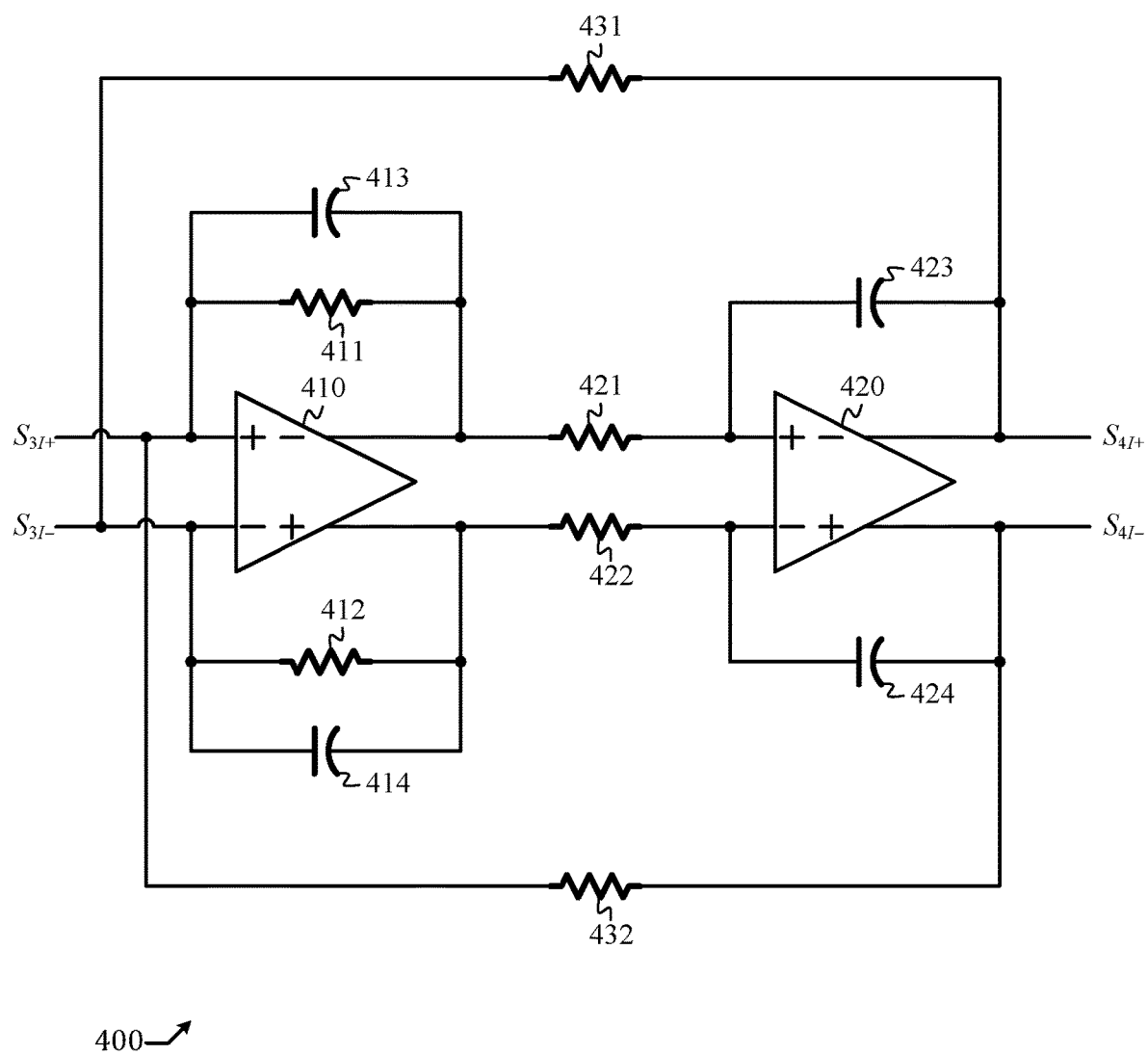
FIG. 4 shows a schematic diagram of a baseband filter.

A schematic diagram of a BBF (baseband filter) 400 that can be used to embody BBF 141 is shown in FIG. 4. BBF 400 comprises: a first opamp 410; a first pair of feedback resistors 411 and 412; a first pair of feedback capacitors 413 and 414; a pair of feed-in resistors 421 and 422; a second opamp 420; a second pair of feedback capacitors 423 and 424; and a second pair of feedback resistors 431 and 433. BBF 400 is a differential signaling embodiment of a "Tow-Thomas biquad filter" that is readily known in the prior art and thus not described in detail here. The same circuit of BBF 400 can be instantiated to embody BBF 142 by replacing $S_{3I+}$, $S_{3I-}$, $S_{4I+}$, and $S_{4I-}$ with $S_{3Q+}$, $S_{3Q-}$, $S_{4Q+}$, and $S_{4Q-}$, respectively. BBF 400 is a $2^{nd}$ order filter and it's merely an example but not limitation. A higher order filter can be used per a discretion of a circuit designer and it can be embodied by cascading a plurality of filters; this is obvious to those of ordinary skills in the art and thus not explained in detail here.

Figure 5:
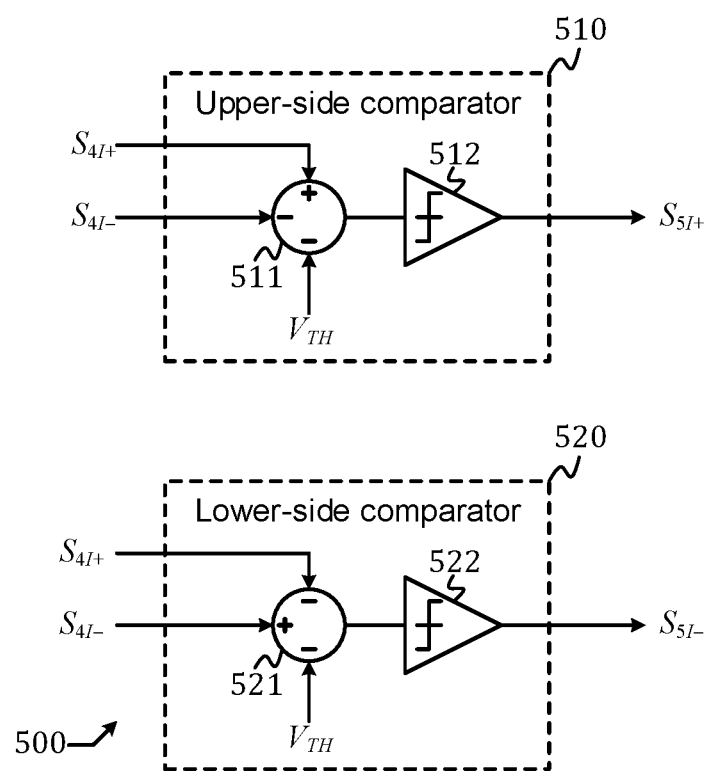
FIG. 5 shows a functional block diagram of a 3-level slicer.

A functional block diagram of a 3-level slicer 500 that can be used to embody 3-level slicer 151 is shown in FIG. 5A. 3-level slicer 500 comprises: an upper-side comparator 510 comprising summer 511 and arbiter 512 and configured to output $S_{5I+}$ in accordance with a sign of $S_{4I+}$ minus $S_{4I-}$ minus $V_{TH}$; and a lower-side comparator 520 comprising summer 521 and arbiter 522 and configured to output $S_{5I-}$ in accordance with a sign of $S_{4I-}$ minus $S_{4I+}$ minus $V_{TH}$. In the upper-side comparator 510, summer 511 embodies $S_{4I+}$ minus $S_{4I-}$ minus $V_{TH}$, while arbiter 512 embodies the sign function. In the lower-side comparator 520, summer 521 embodies $S_{4I-}$ minus $S_{4I+}$ minus $V_{TH}$, while arbiter 522 embodies the sign function.

Mathematically, $$S_{5I+} = \begin{cases} 1 & \text{if } S_{4I+} - S_{4I-} - V_{TH} > 0 \\ 0 & \text{otherwise} \end{cases} \quad (3)$$

and $$S_{5I-} = \begin{cases} 1 & \text{if } S_{4I-} - S_{4+} - V_{TH} > 0 \\ 0 & \text{otherwise} \end{cases} \quad (4)$$

Figure 6:
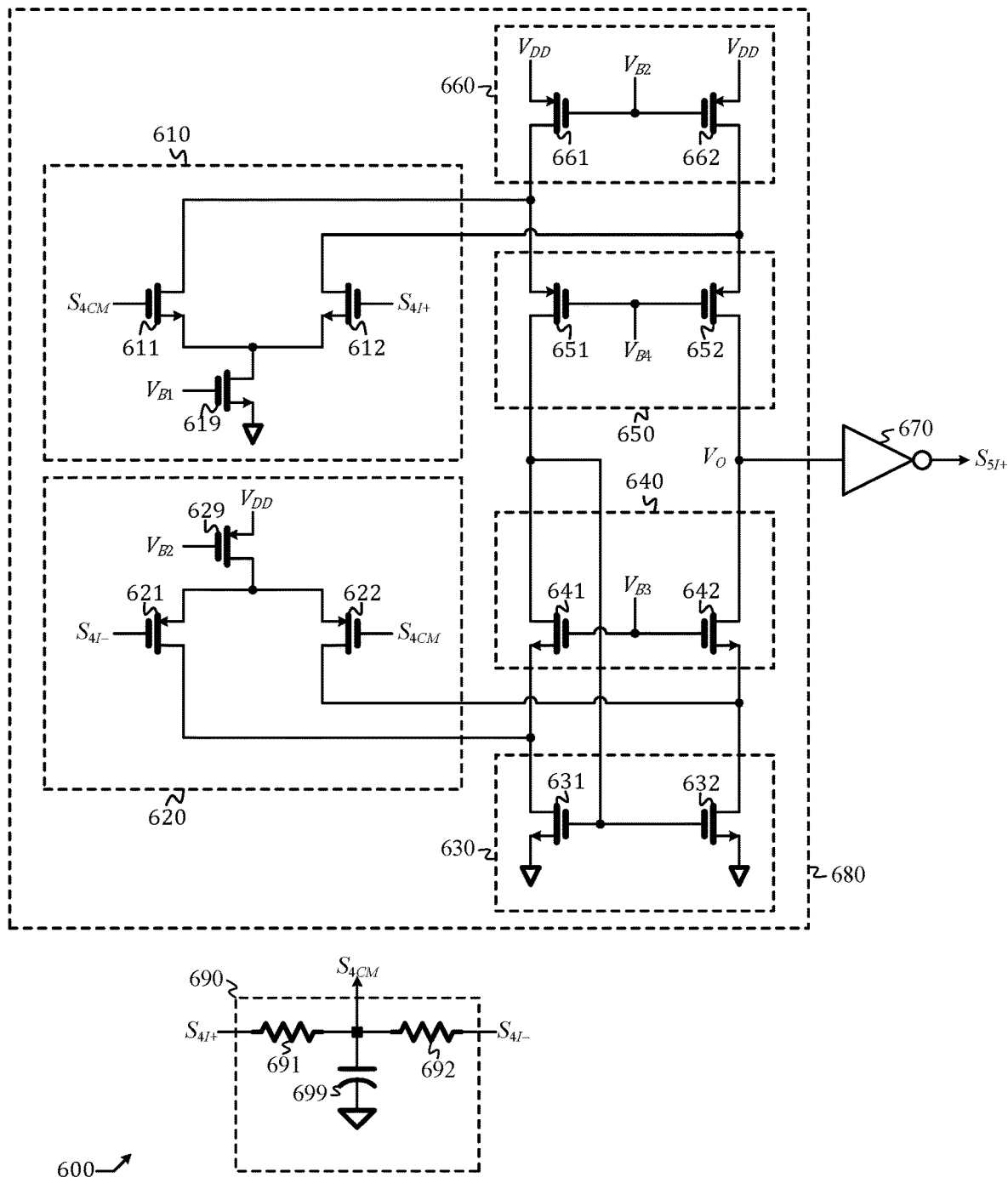
FIG. 6 shows a schematic diagram of an upper-side comparator for the 3-level slicer of FIG. 5.

A schematic diagram of an upper-side comparator 600 that can be used to embody the upper-side comparator 510 is shown in FIG. 6. Upper-side comparator 600 comprises: a common-mode extraction circuit 690 comprising capacitor 699 and resistors 691 and 692 configured to receive $S_{4I+}$ and $S_{4I-}$ and output a common-mode voltage $S_{4CM}$ that is approximately a mean of $S_{4I+}$ and $S_{4I-}$; a high-gain amplifier 680 configured to receive $S_{4I+}$, $S_{4I-}$, and $S_{4CM}$ and output an output voltage $V_O$; and an inverter 670 configured to receive $V_O$ and output $S_{5+}$. The high gain amplifier 680 comprises: a N-type differential amplifier 610 comprising NMOS transistors 611, 612, and 619; a P-type differential amplifier 620 comprising PMOS transistors 621, 622, and 629; a current mirror 630 comprising NMOS transistors 631 and 632; a N-type cascode stage 640 comprising NMOS transistors 641 and 642; a P-type current source 660 comprising PMOS transistors 661 and 662; and a P-type cascode stage 650 comprising PMOS transistors 651 and 652. Here, "$V_{B1}$" denotes a first bias voltage configured to bias the N-type differential amplifier 610, "$V_{B2}$" denotes a second bias voltage configured to bias the P-type differential amplifier 620 and the P-type current source 660, "$V_{B3}$" denotes a third bias voltage configured to bias the N-type cascode stage 640, and "$V_{B4}$" denotes a fourth bias voltage configured to bias the P-type cascode stage 650. If NMOS transistor 611 were to receive $S_{4I-}$ (instead of $S_{4CM}$) and PMOS transistor 623 were to receive $S_{4I+}$ (instead of $S_{4CM}$), the high gain amplifier 680 will become a prior art circuit known as a "complementary folded cascode amplifier" that has been well understood and thus not explained in detail here. However, the high gain amplifier 680 differs from the prior art complementary folded cascode amplifier in the following aspects. First, NMOS transistor 611 receives $S_{4CM}$, as opposed to $S_{4I-}$ as in the case of the prior art complementary folded cascode amplifier. Second, PMOS transistor 622 receives $S_{4CM}$, as opposed to $S_{4I+}$ as in the case of the prior art complementary folded cascode amplifier. Third, a width-to-length ratio of NMOS transistor 611 is intentionally designed to be larger than a width-to-length ratio of NMOS transistor 612, making the N-type differential amplifier 610 unbalanced and gives $S_{4CM}$ an advantage over $S_{4I+}$; this is equivalent to using the same widths and lengths for NMOS transistors 611 and 612 but intentionally adding a first offset voltage $V_{OS1}$ to $S_{4CM}$ at the gate of NMOS transistor 611. Fourth, a width-to-length ratio of PMOS transistor 622 is intentionally designed to be larger than a width-to-length ratio of PMOS transistor 621, making the P-type differential amplifier 620 unbalanced and gives $S_{4CM}$ an advantage over $S_{4I-}$; this is equivalent to using the same widths and lengths for PMOS transistors 621 and 622 but intentionally subtracting a second offset voltage $V_{OS2}$ from $S_{4CM}$ at the gate of PMOS transistor 622. When $S_{4I+}-S_{4I-}$ is not sufficiently high, $S_{4I+}-S_{4CM}$ is not sufficiently high to overcome the advantage that $S_{4CM}$ has over $S_{4I+}$ in the N-type differential amplifier 610, $S_{4I-}-S_{4CM}$ is not sufficiently low to overcome the advantage that $S_{4CM}$ has over $S_{4I-}$ in the P-type differential amplifier 620, and consequently $V_O$ will be high and $S_{5I+}$ will be low. When $S_{4I+}-S_{4I-}$ is sufficiently high, $S_{4I+}-S_{4CM}$ is sufficiently high to overcome the advantage that $S_{4CM}$ has over $S_{4I+}$ in the N-type differential amplifier 610, $S_{4I-}-S_{4CM}$ is sufficiently low to overcome the advantage that $S_{4CM}$ has over $S_{4I-}$ in the P-type differential amplifier 620, and consequently $V_O$ will be low and $S_{5I+}$ will be high. The upper-side comparator 600 thus can embody a function of equation (3), wherein $V_{TH}$ is approximately a sum of the first offset voltage $V_{OS1}$ and the second offset voltage $V_{OS2}$. In an embodiment, the first offset voltage $V_{OS1}$ is approximately the same as the second offset voltage $V_{OS2}$; this can be fulfilled by choosing a proper width-to-length ratio for NMOS transistors 611 and 612 and PMOS transistors 621 and 622. By way of example but not limitation: the width-to-length ratio of NMOS transistor 611 is twice as large as the width-to-length ratio of NMOS transistor 612; and the width-to-length ratio of PMOS transistor 622 is twice as large as the width-to-length ratio of PMOS transistor 621

Figure 7:
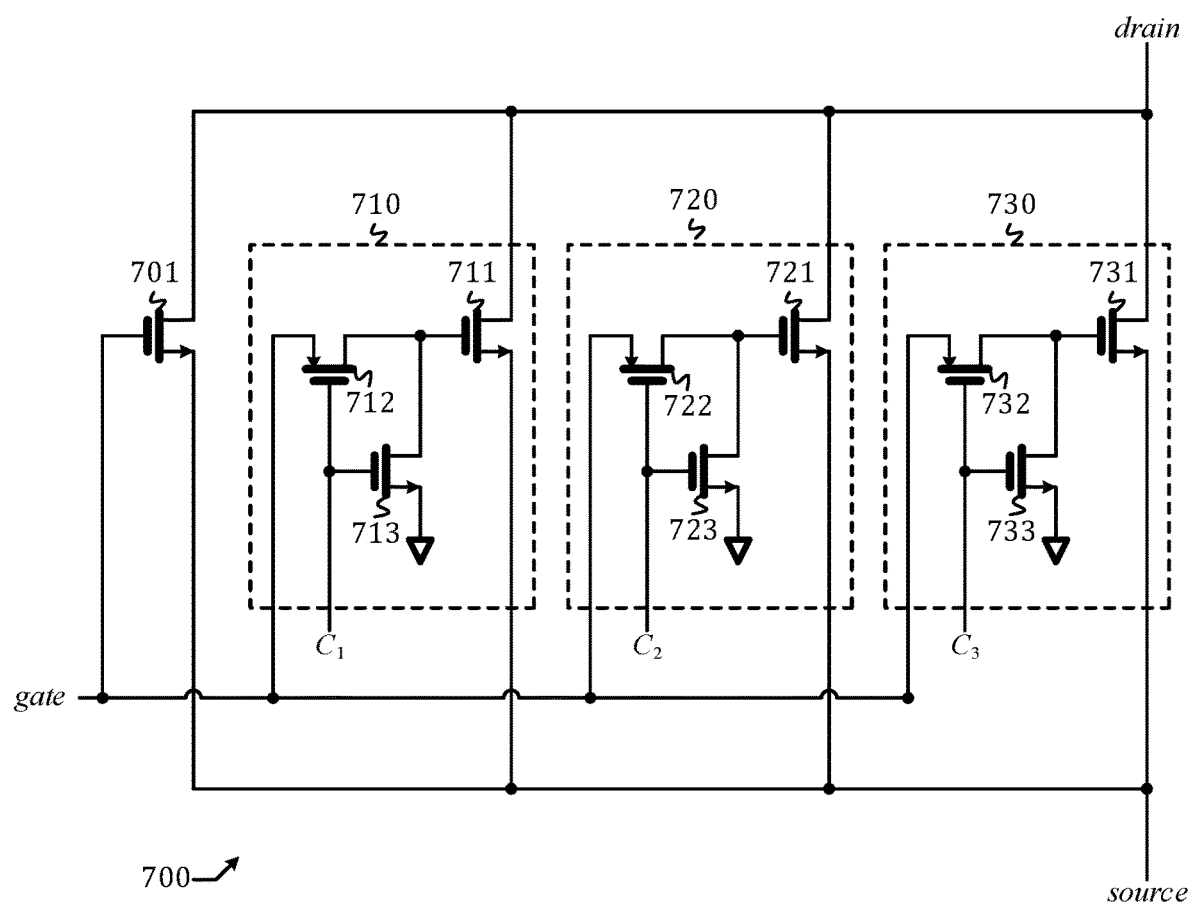
FIG. 7 shows a schematic diagram of an adjustable NMOS transistor.

Note that the first (second) offset voltage $V_{OS1}$ ($V_{OS2}$) is determined by a difference in the width-to-length ratio between NMOS (PMOS) transistors 611 (621) and 612 (622), but also affected by other factors such as temperature. In an embodiment, the first offset voltage $V_{OS1}$ and the second offset voltage $V_{OS2}$ are adjustable; this can be realized by, for instance, adjusting a size of NMOS transistor 611 and a size of PMOS transistor 622, respectively. A size of a transistor can be adjusted, for instance, by using a plurality of switch-transistor units configured in a parallel connection topology, wherein each switch-transistor unit of said plurality of switch-transistor units comprises a respective transistor and a respective switch that can be either turned on or turned off in accordance with a respective control signal. An example of an adjustable NMOS transistor 700 is shown in FIG. 7. Adjustable NMOS transistor 700 comprises a parallel connection of NMOS transistor 701 and a plurality of switch-transistor units 710, 720, 730, and so on controlled by a plurality of control signals $C_1$, $C_2$, $C_3$, and so on, respectively. Switch-transistor unit 710 (720, 730) comprises NMOS transistors 711 (721, 731) and 713 (723, 733) and PMOS transistor 712 (722, 732). When $C_1$ ($C_2$, $C_3$) is high, NMOS transistor 711 (721, 731) is turned off and does not contribute to current conduction. When $C_1$ ($C_2$, $C_3$) is low, NMOS transistor 711 (721, 731) is turned on and effectively connected to NMOS transistor 701 in parallel and can contribute to current conduction. This way, a size of the adjustable NMOS transistor 700 can be effectively adjusted. Adjustable NMOS transistor 700 can be turned into an adjustable PMOS transistor by replacing every NMOS transistor with a PMOS transistor, replacing every PMOS transistor with a NMOS transistor, replacing the ground node with $V_{DD}$, and logically inverting the control signals $C_1$, $C_2$, $C_3$, and so on. In an embodiment, a size of NMOS transistor 611 and a size of PMOS transistor 622 are adjusted in accordance with temperature.

Lower-side comparator 520 is the same as the upper-side comparator 510 except that $S_{4I+}$ and $S_{4I-}$ are swapped, and $S_{5I+}$ is replaced by $S_{5I-}$.

Note that both $S_{5I+}$ and $S_{5I-}$ are logical signals. $S_{5I+}$ is 1 when $S_{4I+}-S_{4I-}-V_{TH}>0$ (or equivalently $S_{4I+}-S_{4I-}>V_{TH}$)

and 0 otherwise. $S_{5I+}$ is 1 when $S_{4I-}-S_{4I+}-V_{TH}>0$ (or equivalently $S_{4I+}-S_{4I-}<-V_{TH}$.

$S_{5I}$ is equal to $S_{5I+}$ minus $S_{5I-}$. A table of values of $S_{5I+}$, $S_{5I-}$, and $S_{5I}$ is shown below:

| scenario | $S_{4I+} -$ $S_{4I-} > V_{TH}$ | $-V_{TH} < S_{4I+} -$ $S_{4I-} < V_{TH}$ | $S_{4I+} -$ $S_{4I-} < -V_{TH}$ |
|---|---|---|---|
| $S_{5I+}$ | 1 | 0 | 0 |
| $S_{5I-}$ | 0 | 0 | 1 |
| $S_{5I}$ | 1 | 0 | -1 |

3-level slicer 500 can be used to embody 3-level slicer 152 by replacing $S_{4I+}$, $S_{4I-}$, $S_{5I+}$ and $S_{5I-}$ with $S_{4Q+}$ and $S_{4Q-}$, $S_{5Q+}$ and $S_{5Q-}$, respectively. Likewise, both $S_{5Q+}$ and $S_{5Q-}$ are logical signals. $S_{5Q+}$ is 1 when $S_{4Q+}-S_{4Q-}-V_{TH}>0$ (or equivalently $S_{4Q+}-S_{4Q-}>V_{TH}$) and 0 otherwise. $S_{5Q+}$ is 1 when $S_{4Q-}-S_{4Q+}-V_{TH}>0$ (or equivalently $S_{4Q+}-S_{4Q-}<-V_{TH}$.

$S_{5Q}$ is equal to $S_{5Q+}$ minus $S_{5Q-}$. A table of values of $S_{5Q+}$, $S_{5Q-}$, and $S_{5Q}$ is shown below:

| scenario | $S_{4Q+} -$ $S_{4Q-} > V_{TH}$ | $-V_{TH} < S_{4Q+} -$ $S_{4Q-} < V_{TH}$ | $S_{4Q+} -$ $S_{4Q-} < -V_{TH}$ |
|---|---|---|---|
| $S_{5Q+}$ | 1 | 0 | 0 |
| $S_{5Q-}$ | 0 | 0 | 1 |
| $S_5$ | 1 | 0 | -1 |

Data flip flops are well understood to those of ordinary skill in the art and thus not explained in detail here.

As mentioned earlier, DSP 170 receives $S_6$ and determines whether the RF signal $S_1$ contains an appreciable component near the frequency of the LO signal $S_{LO}$, by examining if decisions other than (0, 0) are detected; if so, DSP 170 will examine how $S_6$ moves around the eight appreciable decision. If the eight appreciable decisions appear in a random manner, it suggests the appreciable component carries a random data. If $S_6$ moves around the eight appreciable decisions in the complex plane either clockwise or counterclockwise, it indicates the appreciable component is a sinusoidal, and a frequency of the sinusoidal can be estimated by calculating how long it takes to complete a full cycle of the clockwise or counterclockwise movement. This present invention is useful for detecting a radar signal, which is a pulsed sinusoidal signal.

By way of example but not limitation: a frequency of the LO signal $S_{LO}$ is 5.4 GHz; a 3 dB cut-off frequency of BBF 141 and 142 is 40 MHz; a gain from the RF signal $S_1$ to the filtered signal $S_4$ is 50 dB; $V_{TH}$ is 50 mV; and a frequency of the sampling clock signal CK is 160 MHz.

Figure 8:
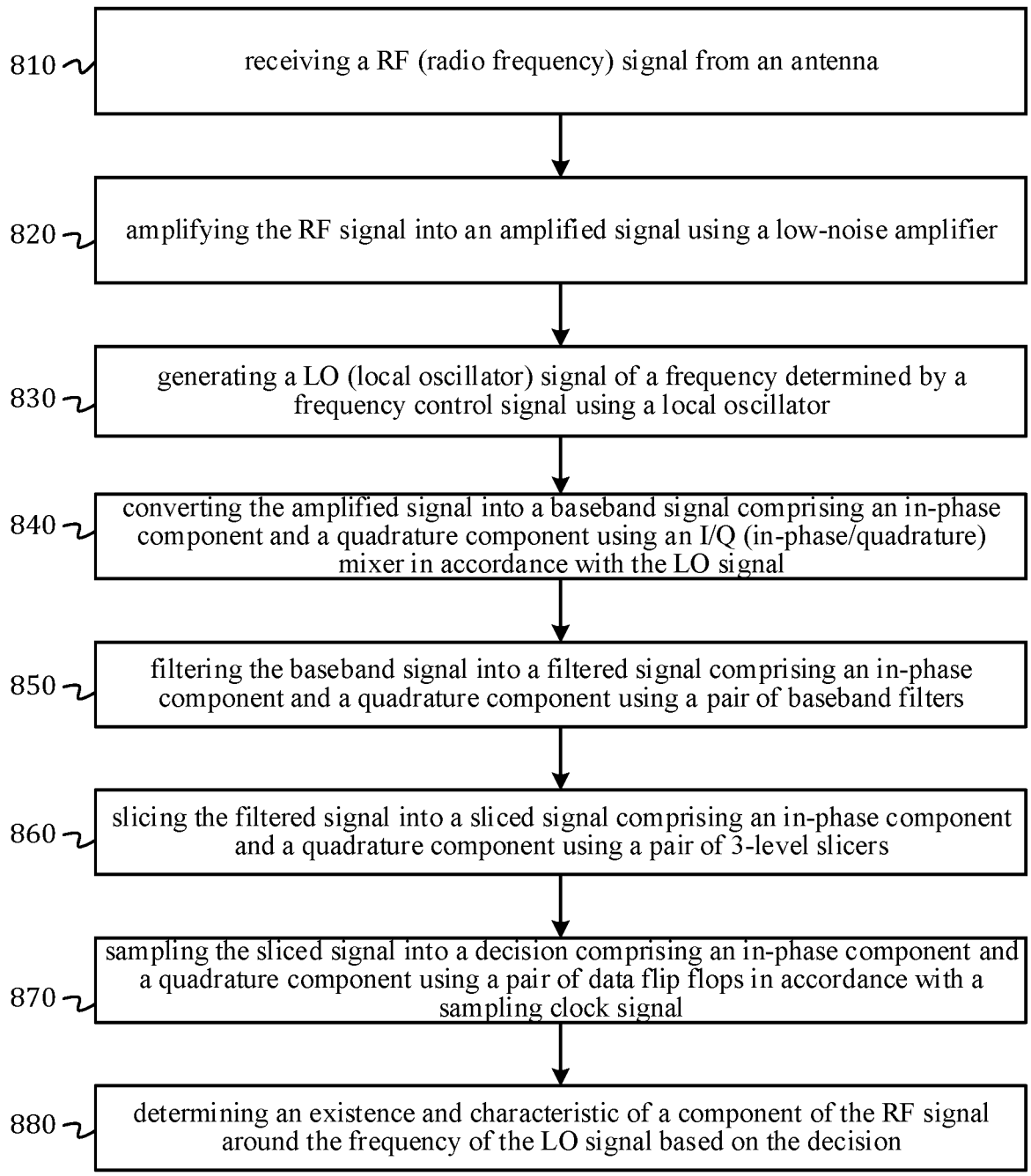
FIG. 8 shows a flow diagram of a method in accordance with an embodiment of the present disclosure.

As illustrated by a flow diagram 800 shown in FIG. 8, a method in accordance with an embodiment of the present disclosure comprises: (step 810) receiving a RF (radio frequency) signal from an antenna; (step 820) amplifying the RF signal into an amplified signal using a low-noise amplifier; (step 830) generating a LO (local oscillator) signal of a frequency determined by a frequency control signal using a local oscillator; (step 840) converting the amplified signal into a baseband signal comprising an in-phase component and a quadrature component using an I/Q (in-phase/quadrature) mixer in accordance with the LO signal; (step 850) filtering the baseband signal into a filtered signal comprising an in-phase component and a quadrature component using a pair of baseband filters; (step 860) slicing the filtered signal into a sliced signal comprising an in-phase component and a quadrature component using a pair of 3-level slicers; (step 870) sampling the sliced signal into a decision comprising an in-phase component and a quadrature component using a pair of data flip flops in accordance with a sampling clock signal; and (step 880) determining an existence and characteristic of a component of the RF signal around the frequency of the LO signal based on the decision.

Those skilled in the art will readily observe that numerous modifications and alterations of the device and method may be made while retaining the teachings of the disclosure. Accordingly, the above disclosure should not be construed as limited only by the metes and bounds of the appended claims.

What is claimed is:

1. A RF (radio frequency) signal detector comprising:
   a low-noise amplifier configured to receive a RF signal from an antenna and output an amplified signal;
   an I/Q (in-phase/quadrature) mixer configured to convert the amplified signal into a baseband signal comprising an in-phase component and a quadrature component in accordance with a LO (local oscillator) signal;
   a local oscillator configured to output the LO signal in accordance with a frequency control signal;
   a pair of baseband filters configured to receive the baseband signal and output a filtered signal comprising an in-phase component and a quadrature component;
   a pair of 3-level slicers configured to receive the filtered signal and output a sliced signal comprising an in-phase component and a quadrature component;
   a pair of data flip flops configured to sample the sliced signal into a decision including an in-phase component and a quadrature component in accordance with a sampling clock signal; and
   a digital signal processor configured to receive the decision and determine an existence and characteristic of a component of the RF signal around a frequency of the LO signal.

2. The RF signal detector of claim 1, wherein the I/Q mixer is a singly-balanced mixer, the amplified signal is single-ended, and the LO signal is a four-phase signal.

3. The RF signal detector of claim 1, wherein the local oscillator comprises a phase lock loop configured to receive a reference clock and output an oscillation signal in accordance with the frequency control signal.

4. The RF signal detector of claim 3, wherein the local oscillator further comprises an I/Q (in-phase/quadrature) clock generator configured to receive the oscillating signal and output the LO signal.

5. The RF signal detector of claim 3, wherein the oscillation signal is the LO signal.

6. The RF signal detector of claim 1, wherein said pair of baseband filters comprises a Tow-Thomas biquad filter.

7. The RF signal detector of claim 1, wherein said pair of 3-level slicers comprises an upper-side comparator and a lower-side comparator.

8. The RF signal detector of claim 7, wherein each of the upper-side comparator and the lower-side comparator comprises a high-gain amplifier followed by an inverter.

9. The RF signal detector of claim 8, wherein the high-gain amplifier comprises an unbalanced differential amplifier, wherein a width-to-length ratio of a first transistor of said unbalanced differential amplifier is larger than a width-to-length ratio of a second transistor of said unbalanced differential amplifier to give the first transistor an advantage over the second transistor in amplification.

10. The RF signal detector of claim 9, wherein a size of the first transistor is adjustable.

11. A method comprising:

receiving a RF (radio frequency) signal from an antenna;

amplifying the RF signal into an amplified signal using a low-noise amplifier;

generating a LO (local oscillator) signal of a frequency determined by a frequency control signal using a local oscillator;

converting the amplified signal into a baseband signal comprising an in-phase component and a quadrature component using an I/Q (in-phase/quadrature) mixer in accordance with the LO signal;

filtering the baseband signal into a filtered signal comprising an in-phase component and a quadrature component using a pair of baseband filters;

slicing the filtered signal into a sliced signal comprising an in-phase component and a quadrature component using a pair of 3-level slicers;

sampling the sliced signal into a decision comprising an in-phase component and a quadrature component using a pair of data flip flops in accordance with a sampling clock signal; and determining an existence and characteristic of a component of the RF signal around the frequency of the LO signal based on the decision.

12. The method of claim 11, wherein the I/Q mixer is a singly-balanced mixer, the amplified signal is single-ended, and the LO signal is a four-phase signal.

13. The method of claim 12, wherein the local oscillator comprises a phase lock loop configured to receive a reference clock and output an oscillation signal in accordance with the frequency control signal.

14. The method of claim 13, wherein the local oscillator further comprises an I/Q (in-phase/quadrature) clock generator configured to receive the oscillating signal and output the LO signal.

15. The method of claim 13, wherein the oscillation signal is the LO signal.

16. The method of claim 11, wherein said pair of baseband filters comprises a Tow-Thomas biquad filter.

17. The method of claim 11, wherein said pair of 3-level slicers comprises an upper-side comparator and a lower-side comparator.

18. The method of claim 17, wherein each of the upper-side comparator and the lower-side comparator comprises a high-gain amplifier followed by an inverter.

19. The method of claim 18, wherein the high-gain amplifier comprises an unbalanced differential amplifier, wherein a width-to-length ratio of a first transistor of said unbalanced differential amplifier is larger than a width-to-length ratio of a second transistor of said unbalanced differential amplifier to give the first transistor an advantage over the second transistor in amplification.

20. The method of claim 19, wherein a size of the first transistor is adjustable.

* * * * *